United States Patent
Lee et al.

(10) Patent No.: US 10,708,952 B2
(45) Date of Patent: Jul. 7, 2020

(54) METHOD FOR TRANSMITTING OR RECEIVING UPLINK SIGNAL IN WIRELESS COMMUNICATION SYSTEM AND DEVICE THEREFOR

(71) Applicant: LG ELECTRONICS INC., Seoul (KR)

(72) Inventors: Hyunho Lee, Seoul (KR); Hanjun Park, Seoul (KR); Yunjung Yi, Seoul (KR); Joonkui Ahn, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/085,948

(22) PCT Filed: Mar. 28, 2017

(86) PCT No.: PCT/KR2017/003316
§ 371 (c)(1),
(2) Date: Sep. 17, 2018

(87) PCT Pub. No.: WO2017/171350
PCT Pub. Date: Oct. 5, 2017

(65) Prior Publication Data
US 2019/0090276 A1    Mar. 21, 2019

Related U.S. Application Data

(60) Provisional application No. 62/314,396, filed on Mar. 29, 2016.

(51) Int. Cl.
*H04W 74/08* (2009.01)
*H04L 5/00* (2006.01)
*H04W 72/12* (2009.01)

(52) U.S. Cl.
CPC ....... *H04W 74/0816* (2013.01); *H04L 5/0035* (2013.01); *H04L 5/0048* (2013.01);
(Continued)

(58) Field of Classification Search
CPC ... H04L 5/0035; H04L 5/0048; H04L 5/0082; H04W 72/1268; H04W 72/1284; H04W 72/1289; H04W 74/0808; H04W 74/0816
See application file for complete search history.

(56) References Cited

U.S. PATENT DOCUMENTS

2014/0140264 A1* 5/2014 Lv ..................... H04W 74/0816
370/312
2015/0085797 A1* 3/2015 Ji ............................. H04J 3/16
370/329

(Continued)

FOREIGN PATENT DOCUMENTS

KR    1020140118678    10/2014
KR    1020160003143    1/2016

(Continued)

OTHER PUBLICATIONS

R1-166147; Discussion on sTTI length; Huawei et al.; Aug. 22, 2016 (Year: 2016).*

(Continued)

*Primary Examiner* — Benjamin H Elliott, IV
(74) *Attorney, Agent, or Firm* — Lee Hong Degerman Kang Waimey

(57) ABSTRACT

A method for transmitting an uplink signal in an unlicensed band for a terminal configured to support multiple transmission time interval (TTI) lengths in a wireless communication system, according to one embodiment of the present invention, is performed by the terminal and may comprises the steps of: receiving a scheduling indication for multiple TTIs; according to the received scheduling indication, performing
(Continued)

channel sensing in a clear channel assessment (CCA) gap for the multiple TTIs; and if channel sensing for at least one of the multiple TTIs is successful, transmitting, in a predetermined symbol, an uplink reference signal for the multiple TTIs.

18 Claims, 8 Drawing Sheets

(52) U.S. Cl.
CPC ....... *H04L 5/0082* (2013.01); *H04W 72/1268* (2013.01); *H04W 72/1284* (2013.01); *H04W 74/0808* (2013.01); *H04W 72/1289* (2013.01)

(56) References Cited

U.S. PATENT DOCUMENTS

| | | | | |
|---|---|---|---|---|
| 2015/0131536 | A1* | 5/2015 | Kaur | H04L 5/001 |
| | | | | 370/329 |
| 2016/0095114 | A1* | 3/2016 | Kim | H04W 74/0816 |
| | | | | 370/329 |
| 2016/0278078 | A1* | 9/2016 | Cheng | H04W 72/0446 |
| 2016/0330630 | A1* | 11/2016 | Yoo | H04L 1/0003 |
| 2017/0290059 | A1* | 10/2017 | Karaki | H04W 74/0816 |
| 2018/0146381 | A1* | 5/2018 | Yoo | H04L 1/0003 |
| 2019/0090276 | A1* | 3/2019 | Lee | H04L 5/0035 |
| 2019/0182676 | A1* | 6/2019 | Xu | H04W 16/14 |

FOREIGN PATENT DOCUMENTS

| | | |
|---|---|---|
| WO | 2015042594 | 3/2015 |
| WO | 2015047849 | 4/2015 |
| WO | 2015187804 | 12/2015 |

OTHER PUBLICATIONS

R1-167018; "On requirements of DM-RS design for UL shorter TTI"; Nokia et al.; Aug. 22, 2016 (Year: 2016).*

PCT International Application No. PCT/KR2017/003316, Written Opinion of the International Searching Authority dated Jul. 7, 2017, 16 pages.

* cited by examiner

METHOD FOR TRANSMITTING OR RECEIVING UPLINK SIGNAL IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/003316, filed on Mar. 28, 2017, which claims the benefit of U.S. Provisional Application No. 62/314,396, filed on Mar. 29, 2016, the contents of which are all hereby incorporated by reference herein in its entirety.

TECHNICAL FIELD

The present invention relates to a wireless communication system, and more particularly, to a method of transmitting or receiving an uplink signal in a wireless communication system and an apparatus therefor.

BACKGROUND ART

In a wireless cellular communication system, discussion on a transmission/reception method capable of reducing latency as much as possible is in progress. In particular, according to the method, data is transmitted as soon as possible within a short time period using a short TTI (transmission time interval) for a service/UE sensitive to latency and a response is transmitted within a short time period in response to the data. On the contrary, it is able to transmit/receive data using a longer TTI for a service/UE less sensitive to latency. For a service/UE sensitive to power efficiency rather than latency, it may be able to repeatedly transmit data using the same low power or transmit data by more extending a TTI. And, a method of performing transmission and reception on an unlicensed band rather than a frequency band of a legacy communication system has been introduced in a wireless cellular communication system.

When a wireless cellular communication system of a short TTI is introduced, the present invention proposes a method of performing uplink transmission on an unlicensed band.

DISCLOSURE OF THE INVENTION

Technical Task

A technical task of the present invention is to provide a method of transmitting or receiving an uplink signal in a wireless communication system and an operation related to the method.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting an uplink signal in an unlicensed band for a terminal configured to support multiple transmission time interval (TTI) lengths in a wireless communication system, includes the steps of receiving a scheduling indication for multiple TTIs, performing channel sensing in a clear channel assessment (CCA) gap for the multiple TTIs according to the received scheduling indication, and when channel sensing is successfully performed for at least one of the multiple TTIs, transmitting an uplink reference signal for the multiple TTIs in a predetermined symbol.

Additionally or alternatively, the CCA gap for the multiple TTIs may be common to the multiple TTIs.

Additionally or alternatively, the CCA gap for the multiple TTIs may include a CCA gap for each of the multiple TTIs.

Additionally or alternatively, when channel sensing is successfully performed in the CCA gap for the multiple TTIs, the method may further include transmitting an uplink channel in the last TTI among the multiple TTIs.

Additionally or alternatively, when channel sensing is successfully performed in the CCA gap for the multiple TTIs, the method may further include transmitting an uplink channel in all of the multiple TTIs.

Additionally or alternatively, a channel sensing threshold for the uplink reference signal may be different from a channel sensing threshold for an uplink channel.

Additionally or alternatively, a channel sensing window size or a backoff threshold for the uplink reference signal may be different from a channel sensing threshold for an uplink channel.

Additionally or alternatively, the uplink reference signal is transmitted in a partial frequency resource of the predetermined symbol and the channel sensing can be performed in a partial frequency resource only within the CCA gap corresponding to a partial frequency resource of the predetermined symbol.

Additionally or alternatively, the method may further include transmitting an uplink channel in a frequency resource corresponding to a partial frequency resource within the CCA gap in a TTI at which the channel sensing is successfully performed.

Additionally or alternatively, the uplink reference signal may be transmitted together with an uplink data channel or an uplink control channel in a TTI in which the predetermined symbol is included.

To further achieve these and other advantages and in accordance with the purpose of the present invention, according to a different embodiment, a terminal configured to transmit an uplink signal in an unlicensed band, configured to support multiple transmission time interval (TTI) lengths in a wireless communication system includes a transmitter and a receiver, and a processor that controls the transmitter and the receiver, receives a scheduling indication for multiple TTIs, performs channel sensing in a clear channel assessment (CCA) gap for the multiple TTIs according to the received scheduling indication, the processor, when channel sensing is successfully performed for at least one of the multiple TTIs, configured to transmit an uplink reference signal for the multiple TTIs in a predetermined symbol.

Additionally or alternatively, the CCA gap for the multiple TTIs may be common to the multiple TTIs.

Additionally or alternatively, the CCA gap for the multiple TTIs may include a CCA gap for each of the multiple TTIs.

Additionally or alternatively, when channel sensing is successfully performed in the CCA gap for the multiple TTIs, the processor may transmit an uplink channel in the last TTI among the multiple TTIs.

Additionally or alternatively, when channel sensing is successfully performed in the CCA gap for the multiple TTIs, the processor may transmit an uplink channel in all of the multiple TTIs.

Additionally or alternatively, a channel sensing threshold for the uplink reference signal may be different from a channel sensing threshold for an uplink channel.

Additionally or alternatively, a channel sensing window size or a backoff threshold for the uplink reference signal may be different from a channel sensing threshold for an uplink channel.

Additionally or alternatively, the uplink reference signal is transmitted in a partial frequency resource of the predetermined symbol and the channel sensing can be performed in a partial frequency resource only within the CCA gap corresponding to a partial frequency resource of the predetermined symbol.

Additionally or alternatively, the processor may transmit an uplink channel in a frequency resource corresponding to a partial frequency resource within the CCA gap in a TTI at which the channel sensing is successfully performed.

Additionally or alternatively, the uplink reference signal may be transmitted together with an uplink data channel or an uplink control channel in a TTI in which the predetermined symbol is included.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to make uplink control information to be efficiently mapped, transmitted, or received in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
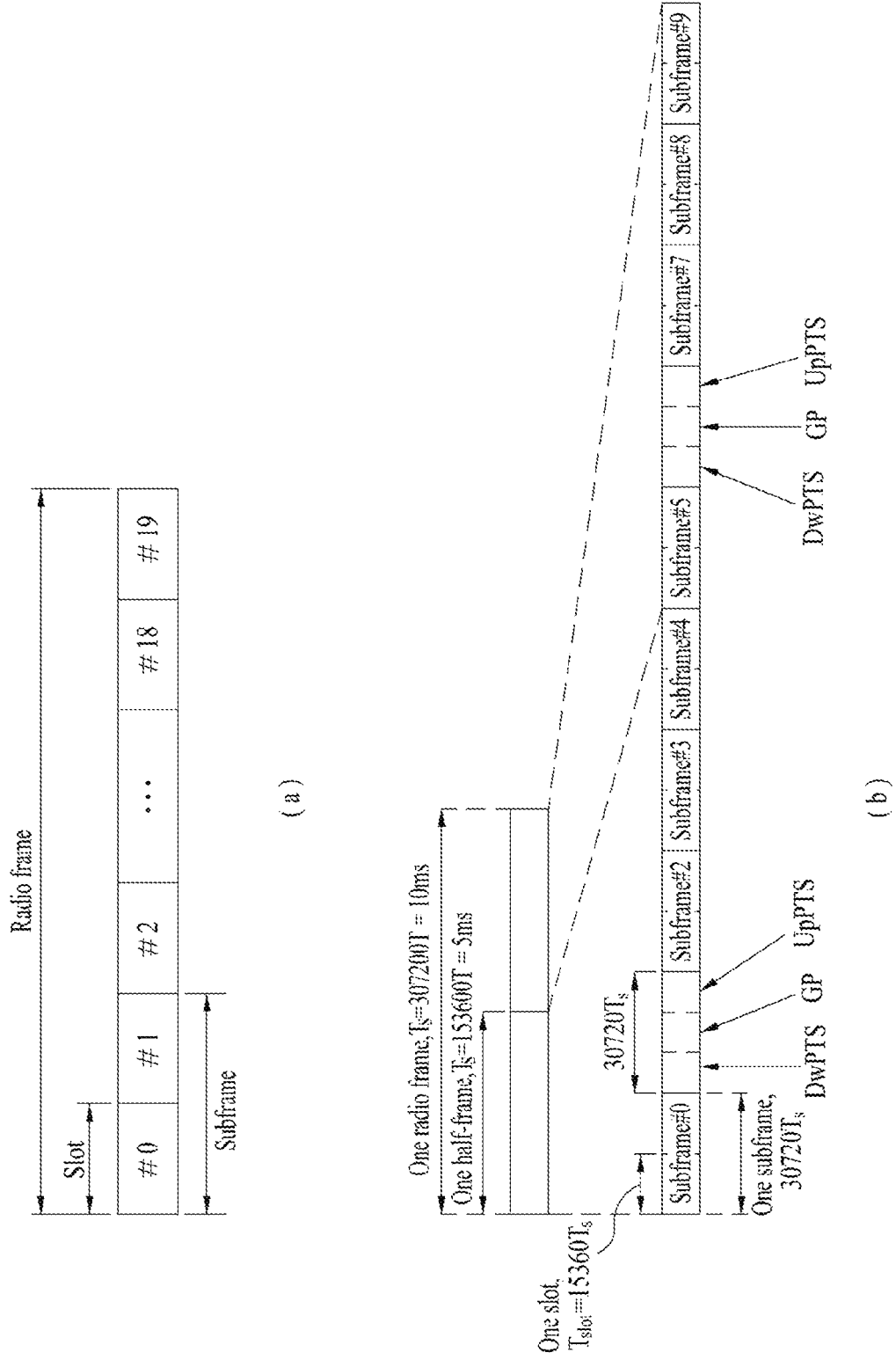
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
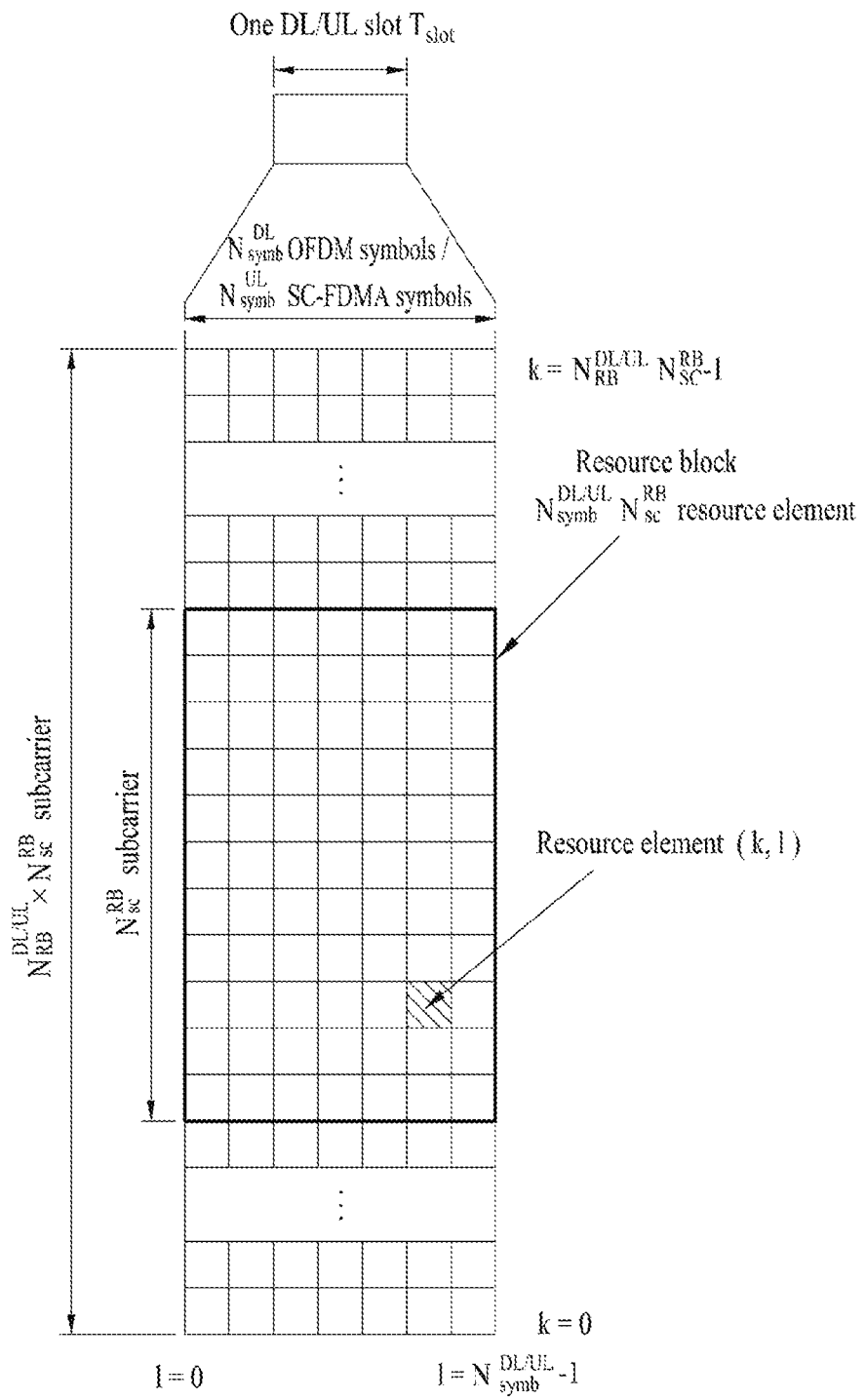
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
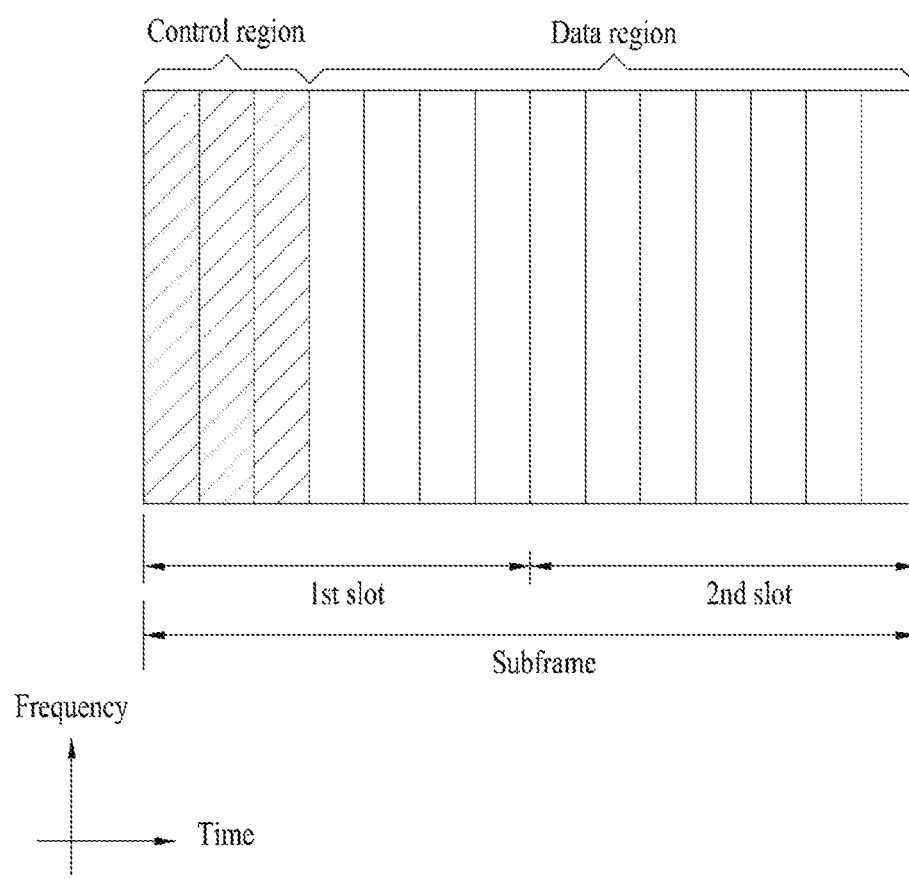
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
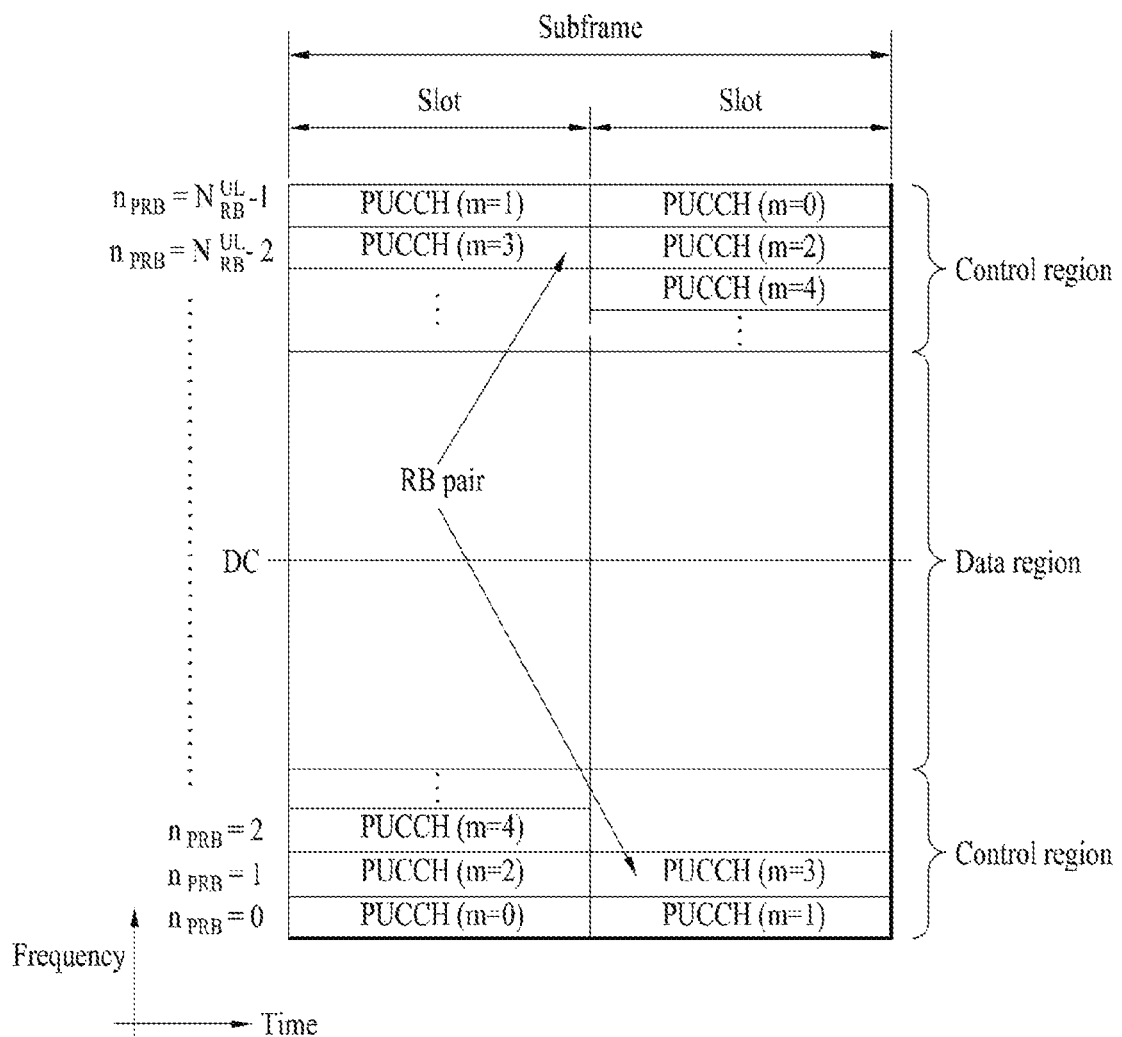
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

The present invention relates to a method of providing a plurality of different services in a system by applying a different service parameter according to a service or a UE to satisfy a requirement of each of a plurality of the services. In particular, the present invention relates to a method of reducing latency as much as possible by transmitting data as soon as possible during a short time period using a short TTI (transmission time interval) for a service/UE sensitive to latency and transmitting a response within short time in response to the data. On the contrary, it may transmit and receive data using a longer TTI for a service/UE less sensitive to the latency. For a service/UE sensitive to power efficiency rather than the latency, it may repetitively transmit data with the same lower power or transmit data using a lengthened TTI.

For clarity, 1 ms currently used in LTE/LTE-A system is assumed as a basic TTI. A basic system is also based on LTE/LTE-A system. When a different service/UE is provided in a base station of LTE/LTE-A system based on a TTI of 1 ms (i.e., a subframe length), a method of transmitting a data/control channel having a TTI unit shorter than 1 ms is proposed for a service/UE sensitive to latency. In the following, a TTI of 1 ms is referred to as a normal TTI, a TTI of a unit smaller than 1 ms (e.g., 0.5 ms) is referred to as a short TTI, and a TTI of a unit longer than 1 ms (e.g., 2 ms) is referred to as a long TTI.

Also, the short TTI can also be expressed by the number of symbols. As described above, one slot in the LTE/LTE-A system is 0.5 ms, and one slot is composed of 7 symbols assuming a normal CP. Therefore, a short TTI can be composed of symbols smaller than 7 in the case of a normal CP, and short TTIs such as 2 symbols and 4 symbols, for example, are possible.

Figure 5:
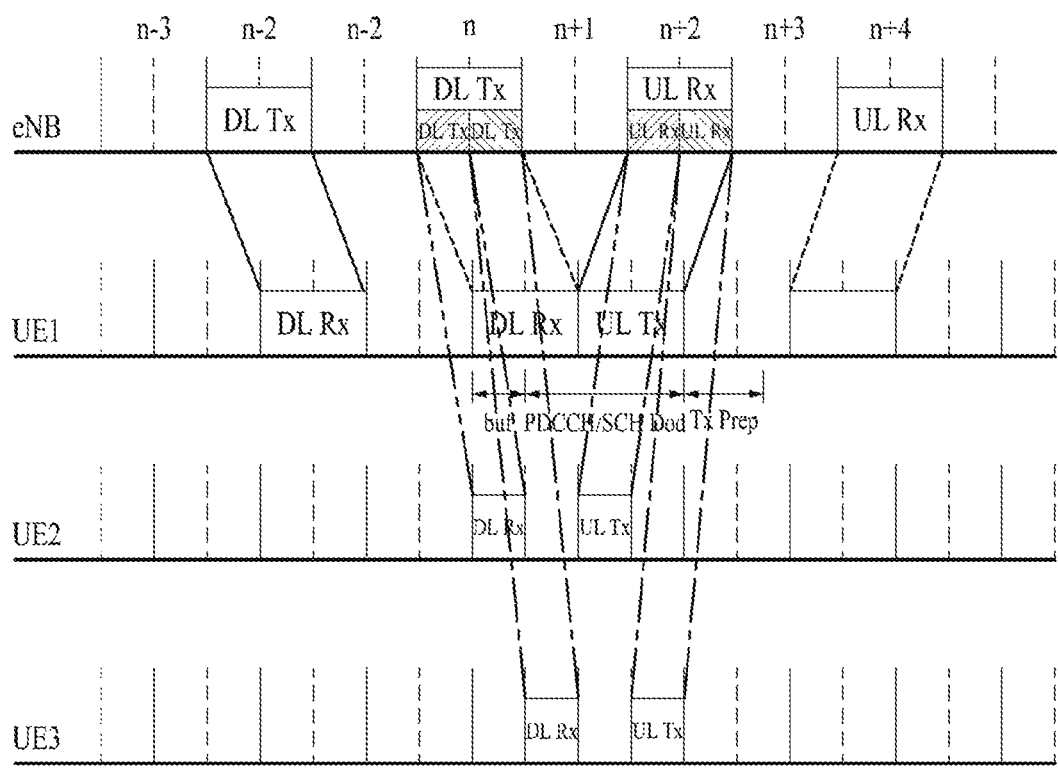
FIG. 5 is a diagram illustrating DL reception timing and UL transmission timing of UEs operating with a different TTI (transmission time interval)

First of all, a method of supporting a short TTI of a unit shorter than 1 ms in a system basically using a normal TTI of 1 ms unit used in legacy LTE/LTE-A system is described. First of all, downlink (DL) is explained. Multiplexing between channels having a different TTI size in an eNB and an example of uplink (UL) transmission for the multiplexing are shown in FIG. 5. As a TTI is getting shorter, time taken for a UE to buffer and decode a control channel and a data channel is getting shorter. Time taken for performing UL transmission in response to the control channel and the data channel is getting shorter. As shown in the example of FIG. 5, in case of transmission of 1 ms TTI, when a DL channel is transmitted in a specific $n^{th}$ subframe, an eNB can receive a response in an $(n+4)^{th}$ subframe in response to the DL channel. In case of transmission of 0.5 TTI, when a DL channel is transmitted in a specific $n^{th}$ subframe, an eNB can receive a response in an $(n+2)^{th}$ subframe in response to the DL channel. In particular, in order to support TTIs of a different length, it is necessary to support backward compatibility to prevent an impact on a UE operating in a legacy system only for DL and UL multiplexing of channels having a different TTI.

In a next system, it may consider a situation that a TTI is variously set to all physical channels or a specific physical channel to satisfy requirements in various application fields. More specifically, in case of 3GPP LTE system, it may be able to configure a TTI corresponding to a unit applied to transmission of a physical channel such as PDSCH/PUSCH/PUCCH to be shorter than 1 msec to reduce latency when communication is performed between an eNB and a UE according to a scenario. And, when a plurality of physical channels exist within a single subframe (e.g., 1 msec) for a single UE or multiple UEs, a TTI can be differently applied to each of a plurality of the physical channels. In the following description of the present invention, for clarity, LTE (LTE-A) system is explained as an example. However, it is apparent that the present invention is applied not only to the LTE (LTE-A) system but also to a communication system to be developed in the future. In this case, a TTI may correspond to 1 msec (i.e., normal TTI) as a normal subframe size in LTE system. A short TTI (i.e., sTTI) corresponds to a value smaller than 1 msec. The sTTI may correspond to a single/multiple OFDM or SC-FDMA symbol unit, by which the present invention may be non-limited. And, a UL data channel and a UL control channel transmitted within the sTTI is referred to as an sPUSCH and an sPUCCH, respectively.

The present invention relates to a method of performing transmission and reception on an unlicensed band rather than a frequency band of a legacy LTE/LTE-A system.

Recently, with the advent of a smart device, data traffic is considerably increasing. As a result, a next generation wireless communication system such as 3GPP LTE-A is trying to find ways to efficiently utilizing a limited frequency band. In particular, the next generation wireless communication system considers managing such a cellular network as LTE-A system and the like on an unlicensed band such as 2.4 GHz or 5 GHz.

Since an unlicensed band basically assumes that wireless transmission and reception are performed via contention between communication nodes, it is required for each communication node to perform channel sensing (CS) before a signal is transmitted to check whether or not a different communication node transmits a signal. For clarity, the above mentioned operation is referred to as LBT (listen before talk) in the present specification. In particular, an operation of checking whether or not a different communication node transmits a signal is defined as CS (carrier sensing) or CCA (clear channel assessment). If it is determined as a different communication node does not transmit a signal, it is defined as a channel unoccupied (or, channel idle) state. If there is signal transmission, it is defined as a channel occupied (or, channel busy) state. In LTE system, an eNB and a UE should perform LBT to transmit a signal on an unlicensed band (hereinafter, U-band). When the eNB or the UE transmits a signal, other communication nodes such as Wi-Fi and the like should perform LBT not to cause interference. For example, according to Wi-Fi standard (802.11ac), a CCA threshold is regulated by −62 dBm for a non-Wi-Fi signal and is regulated by −82 dBm for a Wi-Fi signal. For example, when an STA (station) or an AP (access point) performs CS on an unlicensed band, if a signal other than a Wi-Fi signal is received with power (energy) equal to or greater than −62 dBm, the STA or the AP does not perform signal transmission in order not to cause any interference.

As mentioned in the foregoing description, it may be difficult to always guarantee DL transmission of an eNB or UL transmission of a UE on a U-band. Hence, an LTE UE operating on the U-band may maintain access with a different cell operating on a licensed band (hereinafter, L-band) to stably control mobility, RRM (radio resource management) function, and the like. In particular, a scheme of performing data transmission/reception on the U-band using a combination with the L-band is generally referred to as LAA (licensed assisted access).

In the following description, when a UE supports a plurality of sTTI lengths (or sTTI of multiple lengths), the present invention intends to handle uplink transmission on a U-band. In this case, if a UE is able to support a plurality of sTTI lengths (or sTTI of multiple lengths), it means that the UE is able to receive and demodulate not only a channel transmitted with an sTTI of multiple lengths but also a channel of a normal TTI length in downlink and the UE is able to generate and transmit a channel of an sTTI of multiple lengths and a channel of a normal TTI in uplink.

Figure 6:
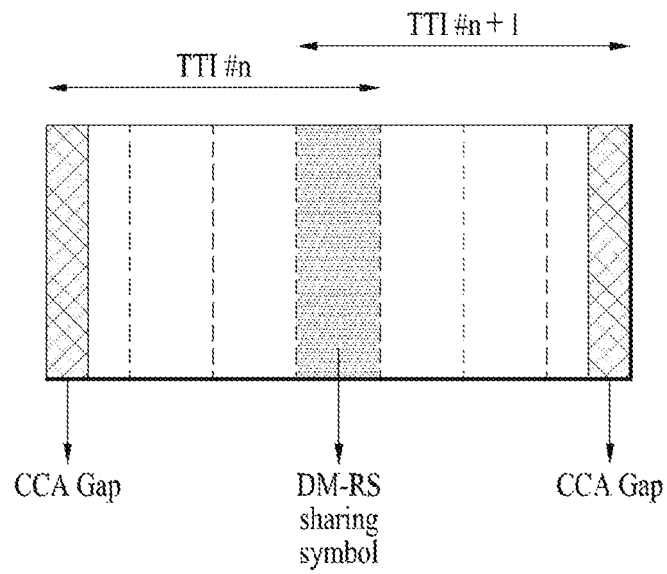
FIG. 6 is a diagram illustrating an uplink demodulation reference signal or an uplink demodulation reference signal symbol shared between TTIs.

Specifically, the present invention proposes a method for a UE to configure and transmit an uplink channel/reference signal on a U-band capable of configuring one or a plurality of TTI lengths (e.g., shorter than 1 ms) different from 1 ms TTI of a legacy LTE/LTE-A system. In this case, it is necessary to additionally consider the following. If a sTTI is introduced, an uplink transmission resource is reduced. If an uplink DMRS is transmitted, the uplink DMRS occupies a relatively big part of a transmission resource. Hence, as shown in FIG. 6, it may consider a method of sharing a DMRS symbol between TTIs. FIG. 6 illustrates a case that two TTIs share a symbol as a DMRS symbol. However, it is apparent that two or more TTIs are able to share a DMRS symbol. In the present invention, the sharing of the DMRS symbol can be simply referred to as "DMRS sharing". Yet, the DMRS sharing does not mean that UEs different from each other transmit the same DMRS (sequence). The DMRS sharing means that a DMRS is transmitted via a common symbol.

UL Transmission in Unlicensed Band with TTI Shortening

When LBT to be performed for UL transmission on a U-band is considered, DMRS sharing between TTIs currently considered in LTE standardization may not be appropriate. For example, when UEs different from each other intend to use adjacent TTIs for DMRS sharing, if a UE occupying a forepart TTI transmits a DMRS, it is difficult to transmit a DMRS for a UL channel to be transmitted at a rear part TTI. In UL, it is also necessary to configure a gap for performing CCA. If a CCA gap is located at the forepart or the rear part within a TTI, DMRS sharing between TTIs may not be appropriate. Hence, it is necessary to handle positions of a DMRS symbol and the CCA gap. The present invention proposes various methods of transmitting a DMRS on a U-band and a method of configuring CCA.

A Plurality of TTIs Sharing DMRS are Scheduled to Single UE

When DMRSs for a plurality of TTIs are transmitted in a specific symbol at the same time on a U-band, it may be able to define a rule that a plurality of the TTIs are scheduled to a single UE. In this case, if a UL grant exists in each of a plurality of the TTIs, it may be able to regulate a UE behavior as follows.

The UE transmits a PUSCH and a DMRS by applying an RA (resource allocation) field, a DMRS CS (cyclic shift) field, and an MCS (modulation and coding scheme) field of a UL grant for a predetermined/predefined specific TTI.

In this case, the RS field, the DMRS CS field, and the MCS field of the UL grant for the remaining TTIs can be defined to be interpreted for a different usage. For example, the different usage is to determine whether or not a plurality of TTIs sharing a DMRS are scheduled.

Or, the RS field, the DMRS CS field, and the MCS field of the UL grant for the remaining TTIs can be omitted.

Or, when multi-TTI scheduling is performed on a plurality of TTIs sharing a DMRS via a UL grant, information on whether or not a plurality of the TTIs sharing the DMRS are scheduled can be explicitly signaled by including a new field in DCI or reinterpreting a legacy field.

When DMRSs for a plurality of TTIs are transmitted in a specific symbol at the same time on a U-band, a CCA gap configuration can be differently determined according to a TTI in accordance with transmission timing of a DMRS to be shared. For example, as shown in FIG. 6, a CCA gap within a TTI #n is set to a forepart of a TTI and a CCA gap within a TTI #n+1 can be set to a rear part of the TTI.

UL DMRS Transmission without LBT

If a symbol for transmitting a DMRS is promised in advance and UL transmission is scheduled within prescribed time (e.g., 1 ms or x number of symbols), it may be able to define a rule that a UE transmits a DMRS in a DMRS symbol designated within the prescribed time irrespective of whether or not the UE successfully performs LBT of the UE. In particular, although the UE transmits data according to an LBT result on a U-band, the UE is able to transmit a DMRS irrespective of whether or not LBT is successfully performed.

For example, if it is assumed that a fourth symbol among 7 symbols is designated as a symbol in which a DMRS is transmitted and each symbol configures 2-symbol TTI with the fourth symbol (i.e., symbol index {1,4}=TTI #1, {2,4}=TTI #2, {3,4}=TTI #3, {4,5}=TTI #4, {4,6}=TTI #5, {4,7}=TTI #6), although a UE scheduled in the fifth, the sixth, and the seventh symbol fails to perform LBT on TTIs (i.e., TTI #4, TTI #5, TTI #6), it may be able to define a rule that the UE transmits a DMRS in the fourth symbol.

Or, if a symbol for transmitting a DMRS is promised in advance and UL transmission is scheduled within prescribed time (e.g., 1 ms or x number of symbols), it may be able to define a rule that a UE transmits a DMRS only when LBT is successfully performed on data transmission of at least one or more TTIs in a DMRS symbol designated within the prescribed time.

Setting CCA Gap to Symbol Immediately Before Symbol in which DMRS is Shared

Figure 7:
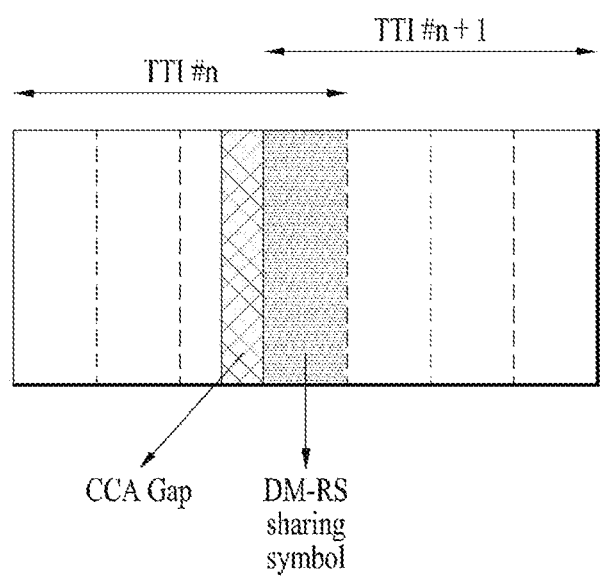
FIG. 7 is a diagram illustrating an uplink demodulation reference signal or an uplink demodulation reference signal symbol shared between TTIs.

When DMRSs for a plurality of TTIs are transmitted in a specific symbol at the same time on a U-band, it may be able to define a rule that a CCA gap is set to a symbol immediately before the specific symbol for prescribed time and a DMRS is transmitted within a TTI including the CCA gap without LBT. FIG. 7 illustrates a specific example for the abovementioned rule. If a CCA gap is set to a symbol immediately before a DMRS symbol in a TTI #n, a UE is able to transmit a DMRS in the DMRS sharing symbol after the CCA gap irrespective of an LBT result in the CCA gap. In a TTI #n+1, the UE performs LBT in the CCA gap, transmits a DMRS in the DMRS sharing symbol, and transmits a UL channel.

Setting Common CCA Gap to a Plurality of TTIs Sharing DMRS

When DMRSs for a plurality of TTIs (e.g., TTI #n~#n+k, where k is an integer greater than 0) are transmitted in a specific symbol at the same time on a U-band, if a CCA gap common to a plurality of the TTIs is configured and LBT is successfully performed in the CCA gap, it may be able to define a rule that UL transmission is allowed in the TTI #n+k.

Or, when DMRSs for a plurality of TTIs (e.g., TTI #n~#n+k, where k is an integer greater than 0) are transmitted in a specific symbol at the same time on a U-band, if a CCA gap common to a plurality of the TTIs is configured and LBT is successfully performed in the CCA gap, it may be able to define a rule that UL transmission is allowed in the TTI #n~#n+k.

LBT Threshold of DMRS and LBT Threshold of UL Channel are Differently Configured It may be able to define a rule that an LBT threshold of a DMRS and an LBT threshold of a UL channel are differently configured on a U-band. For example, the LBT threshold of the DMRS can be configured to be higher than the LBT threshold of the UL channel to support a structure that DMRSs for a plurality of TTIs are transmitted in a specific symbol at the same time. Similarly, it may be able to define a rule that a contention window size or a back-off counter is differently configured for LBT of a DMRS and a UL channel.

Frequency-Selective LBT

When UL LBT is performed on a U-band, it may be able to define a rule that the LBT is to be performed on a specific frequency resource only. For example, when DMRSs for a plurality of TTIs are transmitted in a specific symbol and are mapped to a different RE (resource element), it may be able to define a rule that LBT is performed on a subcarrier in which a DMRS and/or UL data is transmitted only when the UL LBT is performed.

Specifically, when DMRSs for a plurality of TTIs are simultaneously transmitted in a specific symbol and are mapped to a different RE, a UL channel corresponding to a TTI #n is transmitted in a subcarrier identical to a subcarrier to which a DMRS is mapped during prescribed time immediately before the specific symbol (e.g., 1 symbol prior to the DMRS symbol) and LBT corresponding to a TTI #n+1 is performed in a subcarrier in which a DMRS of a corresponding TTI is transmitted or mapped only.

Configuring Resource in which UL Data is not Transmitted for LBT

When UL data is transmitted in a specific TTI of a U-band, it may be able to define a rule that an unused RB(s) or a subcarrier(s) is designated to a UE and the UE performs LBT in the designated RB(s) or the subcarrier(s) only when UL LBT or DMRS LBT is performed. In this case, when the UL data is transmitted, an unused resource (RB(s) or subcarrier(s)) can be differently configured according to a TTI. And, the resource can be restricted to a symbol only prior to a DMRS symbol.

Triggering Signal for Transmitting DMRS

A network configures a predefined/predetermined specific signal (e.g., a common signal or a specific reservation signal) to be transmitted prior to a DMRS symbol. If a UE detects the specific signal, the UE directly transmits a DMRS at the DMRS symbol timing without LBT.

Restriction on DMRS Sharing

When sTTI UL transmission is performed on a U-band, it may be able to define a rule that DMRS sharing is not permitted and mapping is performed in a manner of including an individual DMRS for each sTTI.

The abovementioned UE operation or a rule can be indicated to a UE via higher layer signaling or physical layer signaling. Or, a UE operation or a rule to be applied during specific time (e.g., during a legacy TTI length) can be determined by introducing a specific common signal. And, it may be able to apply one of the aforementioned UE operation and the rule to a specific limited frequency domain. And, it may be able to apply one of the aforementioned UE operation and the rule according to a TTI length configured for UL transmission on a U-band.

When sPUCCH transmission is allowed on a U-band, the present invention proposes a transmission method described in the following.

If a TTI length of sPUSCH is identical to a TTI length of sPUCCH, it may always have a sPUCCH DMRS structure identical to that of the sPUSCH. For example, if the sPUSCH has a DMRS sharing structure, the sPUCCH also has a DMRS sharing structure.

It may have a sPUCCH DMRS structure identical to that of the sPUSCH only when PUCCH/PUSCH simultaneous transmission is configured or a separate PUCCH/PUSCH simultaneous transmission is configured for a U-band.

It may have a sPUCCH DMRS structure identical to that of the sPUSCH only when sPUSCH is scheduled in a corresponding sTTI. Whether or not piggyback is performed on all or a part of UCI is determined using a combination of UCI payload and a TTI length only when sPUSCH is scheduled in a corresponding sTTI.

Although the aforementioned rules are applied, it is still able to transmit an additional DMRS on a sPUCCH. For example, it may assume a situation that two DMRS symbols are transmitted on a sPUCCH and one of the DMRS symbols is shared by a plurality of TTIs only. In this case, it may assume that the same DMRS sequence is used for the remaining symbol as well. Yet, it may use an orthogonal cover code (OCC), and the like.

Figure 8:
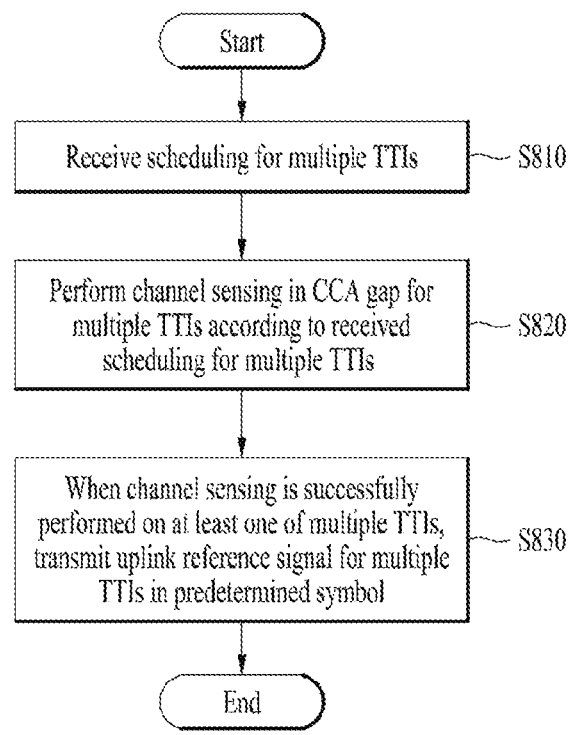
FIG. 8 is a flowchart illustrating an operation of a UE.

FIG. 8 is a flowchart illustrating an operation of a UE.

The UE is configured to support multiple transmission time interval (TTI) lengths in a wireless communication system and can be configured to transmit an uplink signal on an unlicensed band.

The UE can receive a scheduling indication for multiple TTIs [S810]. The UE can perform channel sensing in a clear channel assessment (CCA) gap for the multiple TTIs according to the received scheduling indication [S820]. If channel sensing is successfully performed on at least one of the multiple TTIs, the UE can transmit an uplink reference signal for the multiple TTIs in a predetermined symbol [S830].

Additionally or alternatively, the CCA gap for the multiple TTIs is common to the multiple TTIs. Or, the CCA gap for the multiple TTIs can include a CCA gap for each of the multiple TTIs.

If channel sensing is successfully performed in the CCA gap for the multiple TTIs, the UE can transmit an uplink channel in the last TTI among the multiple TTIs.

If channel sensing is successfully performed in the CCA gap for the multiple TTIs, the UE can transmit an uplink channel in the whole of the multiple TTIs.

A threshold of channel sensing for the uplink reference signal may be different from a threshold of channel sensing for an uplink channel. And/or, a window size or a backoff threshold of channel sensing for the uplink reference signal may be different from a threshold of channel sensing for an uplink channel.

The uplink reference signal is transmitted in a partial frequency resource among the predetermined symbols and the channel sensing can be performed in a partial frequency resource only within the CCA gap corresponding to a partial frequency resource among the predetermined symbols.

The UE can transmit an uplink channel in a frequency resource corresponding to a partial frequency resource included in the CCA gap in a TTI at which the channel sensing is successfully performed.

The uplink reference signal can be transmitted together with an uplink data channel or an uplink control channel in a TTI in which the predetermined symbol is included.

In the foregoing description, embodiments of the present invention have been briefly explained with reference to FIG. 8. An embodiment related to FIG. 8 can alternatively or additionally include at least a part of the aforementioned embodiments.

Figure 9:
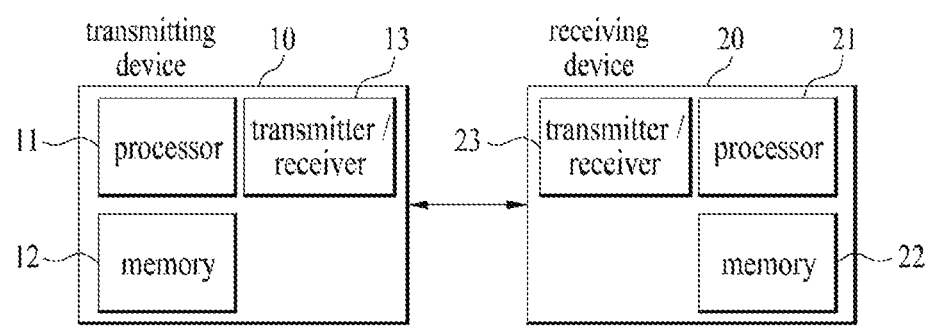
FIG. 9 is a block diagram of a device for implementing embodiment(s) of the present invention.

FIG. 9 is a block diagram illustrating a transmitting device 10 and a receiving device 20 configured to implement embodiments of the present invention. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmiting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present invention, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or receiving device may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention can be used for such a wireless communication device as a terminal, a relay, a base station, and the like.

What is claimed is:

1. A method of transmitting an uplink signal in an unlicensed band for by a terminal configured to support multiple transmission time interval (TTI) lengths in a wireless communication system, the method comprising:
   receiving a scheduling indication for one or more transmission time intervals (TTIS);
   performing channel sensing in a clear channel assessment (CCA) gap for the one or more TTIs according to the received scheduling indication; and
   transmitting an uplink reference signal for the one or more TTIs in a predetermined symbol based on that channel sensing is successfully performed for at least one of the one more TTIs,
   wherein the uplink reference signal is transmitted in a partial frequency resource of the predetermined symbol, and
   wherein the channel sensing is performed only in a partial frequency resource within the CCA gap corresponding to a partial frequency resource of the predetermined symbol.

2. The method of claim 1, wherein the CCA gap for the one or more TTIs is common to the one or more TTIs.

3. The method of claim 1, wherein the CCA gap for the one or more TTIs includes a CCA gap for each of the one or more TTIs.

4. The method of claim 1, when channel sensing is successfully performed in the CCA gap for the one or more TTIs, further comprising transmitting an uplink channel in the last TTI among the one or more TTIs.

5. The method of claim 1, when channel sensing is successfully performed in the CCA gap for the one or more TTIs, further comprising transmitting an uplink channel in all of the one or more TTIs.

6. The method of claim 1, wherein a channel sensing threshold for the uplink reference signal is different from a channel sensing threshold for an uplink channel.

7. The method of claim 1, wherein a channel sensing window size or a backoff threshold for the uplink reference signal is different from a channel sensing threshold for an uplink channel.

8. The method of claim 1, further comprising transmitting an uplink channel in a frequency resource corresponding to a partial frequency resource within the CCA gap in a TTI at which the channel sensing is successfully performed.

9. The method of claim 1, wherein the uplink reference signal is transmitted together with an uplink data channel or an uplink control channel in a TTI in which the predetermined symbol is included.

10. A terminal configured to transmit an uplink signal in an unlicensed band a wireless communication system, the terminal comprising:
    a transmitter and a receiver; and
    a processor that:
      controls the transmitter and the receiver, wherein the processor receives a scheduling indication for one or more transmission time intervals (TTIS);
      performs channel sensing in a clear channel assessment (CCA) gap for the one or more TTIs according to the received scheduling indication, and
      transmits an uplink reference signal for the one or more TTIs in a predetermined symbol based on that channel sensing is successfully performed for at least one of the one or more TTIs,
    wherein the uplink reference signal is transmitted in a partial frequency resource of the predetermined symbol, and
    wherein the channel sensing is performed only in a partial frequency resource within the CCA gap corresponding to a partial frequency resource of the predetermined symbol.

11. The terminal of claim 10, wherein the CCA gap for the one or more TTIs is common to the one or more TTIs.

12. The terminal of claim 10, wherein the CCA gap for the one or more TTIs includes a CCA gap for each of the one or more TTIs.

13. The terminal of claim 10, wherein when channel sensing is successfully performed in the CCA gap for the one or more TTIs, the processor transmits an uplink channel in the last TTI among the one or more TTIs.

14. The terminal of claim 10, wherein when channel sensing is successfully performed in the CCA gap for the one or more TTIs, the processor transmits an uplink channel in all of the one or more TTIs.

15. The terminal of claim 10, wherein a channel sensing threshold for the uplink reference signal is different from a channel sensing threshold for an uplink channel.

16. The terminal of claim 10, wherein a channel sensing window size or a backoff threshold for the uplink reference signal is different from a channel sensing threshold for an uplink channel.

17. The terminal of claim 10, wherein the processor transmits an uplink channel in a frequency resource corresponding to a partial frequency resource within the CCA gap in a TTI at which the channel sensing is successfully performed.

18. The terminal of claim 10, wherein the uplink reference signal is transmitted together with an uplink data channel or an uplink control channel in a TTI in which the predetermined symbol is included.

* * * * *